March 1, 1927.

A. A. BAFFETTI

VULCANIZER

Filed Sept. 12, 1923   2 Sheets-Sheet 1

1,619,231

INVENTOR.
Achille. A. Baffetti.
BY
Roger Sherman Hoar
ATTORNEY.

March 1, 1927.
A. A. BAFFETTI
1,619,231
VULCANIZER
Filed Sept. 12, 1923    2 Sheets-Sheet 2
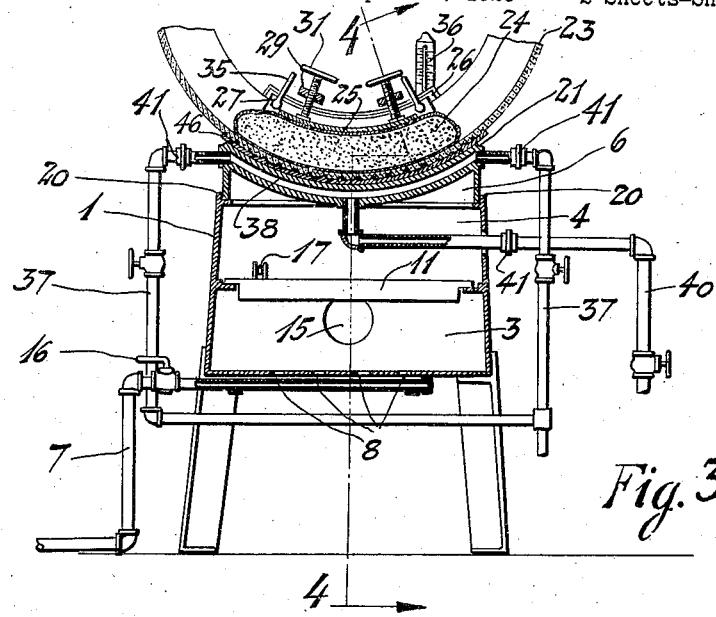
Fig. 3.
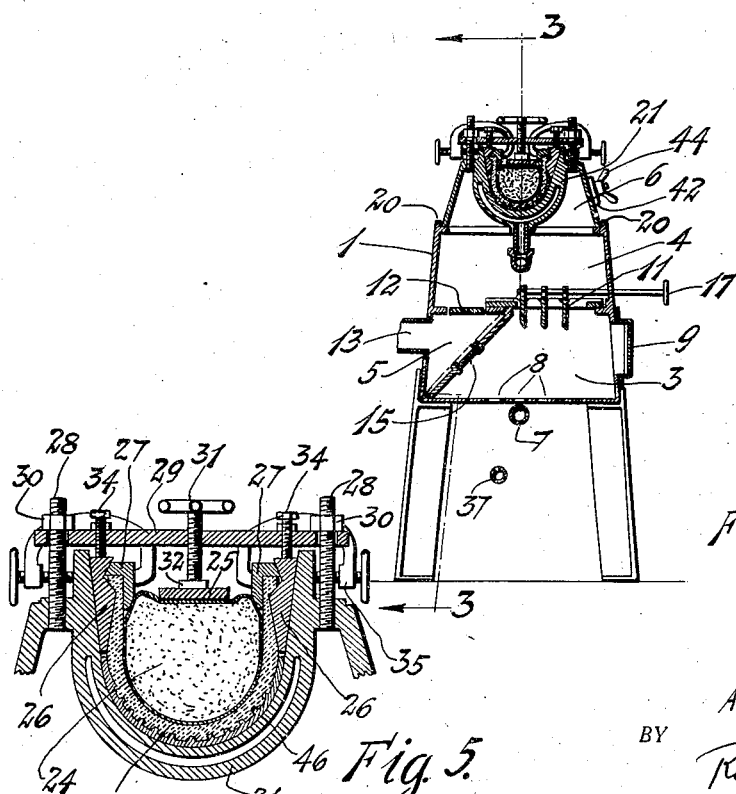
Fig. 4.
Fig. 5.
INVENTOR.
Achille A. Baffetti.
BY
Roger Sherman Hoar
ATTORNEY.

Patented Mar. 1, 1927.

1,619,231

UNITED STATES PATENT OFFICE.

ACHILLE A. BAFFETTI, OF CHICAGO, ILLINOIS.

VULCANIZER.

Application filed September 12, 1923. Serial No. 662,255.

My invention relates to new and useful improvements in vulcanizers, and has for its principal object to provide a combined vulcanizer for patching the shoes of automobile tires, for retreading such shoes, and for patching inner tubes.

A further object of my invention is to provide a vulcanizer in which the rubber of the patch flows into the rubber of the thing patched, thereby becoming integral with it, rather than merely stuck to it.

A further object is to place at the disposal of all garages, service-stations and private automobile owners, a cheap and serviceable vulcanizer.

In automobile tire factories, in order that the rubber and the fabric shall blend together to form a homogeneous whole, it is considered necessary to subject the tire to a uniform pressure of between 1500 to 2000 pounds of 307 degree superheated dry steam during vulcanizing.

This would be desirable in the case of repair vulcanizers. In the past these have usually had their pressure supplied by a pneumatic bag, but the pressure of this bag is usually limited to about 75 pounds, when the bag is new; and as the bag becomes old and hard, and has to be padded with rags, the pressure becomes most uneven and its maximum drops off considerably.

Furthermore the heat is usually supplied by wet steam, which is most undesirable.

As a result of all the foregoing, the patch merely sticks to the tire, and in no respect becomes thoroughly integral with it.

Furthermore, a separate machine is usually required for each of the following: patching each size of shoe, retreading each size of shoe, and patching an inner tube.

Furthermore the patch is usually chilled too suddenly by plunging it into water.

It is my object to eliminate these troubles, and to provide a simpler, more rugged and more efficient mechanism. Other advantages of my design will naturally suggest themselves as the description progresses. It is within the province of the disclosure to improve generally and to enhance the utility of devices of that type to which the invention appertains.

Figure 1:
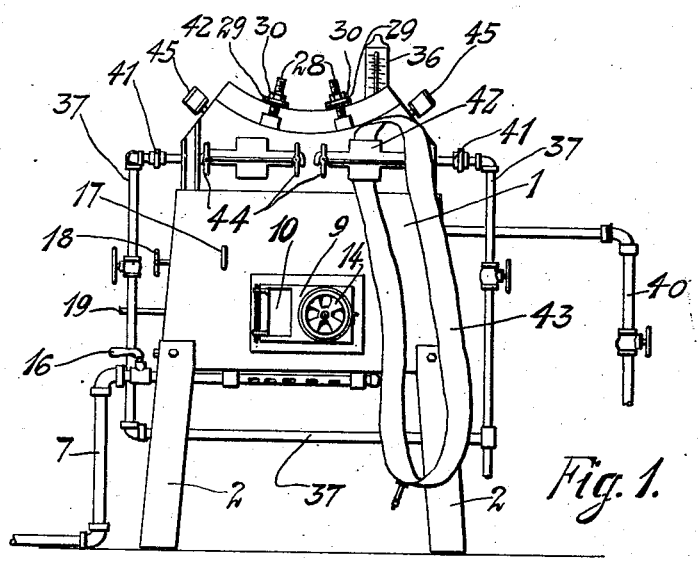
Figure 2:
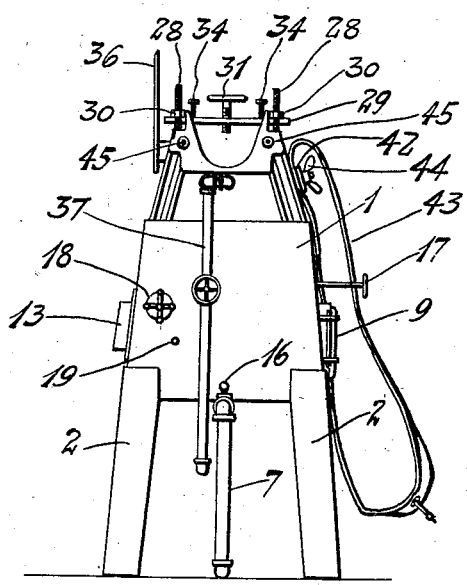

With these general objects in view, the invention resides in the novel features of construction, combination and arrangement of parts which will be hereinafter more particularly described and claimed, and shown in the accompanying drawings, wherein:

Figure 1 is a side view, Figure 2 is an end view, and Figures 3 and 4 are two views partly in section along the lines 33 and 44 indicated respectively in Figures 4 and 3.

Figure 5 is an enlargement of part of Figure 4.

Referring more particularly to the drawings, it will be seen that 1 represents the main body of the vulcanizer, supported on four legs 2. The main body 1 is divided into four parts as follows: the fire chamber 3, the hot-air chamber 4, the outlet chamber 5, and the mold chamber 6.

In the particular embodiment shown, gas is conveyed through the pipe 7 to the burners 8, which may be of any convenient form, within the fire-chamber 3. Other means of heating may be substituted.

The fire is lighted through the door 9, and may be observed through the pane of glass 10. The fire heats the air in the fire chamber 3, and this hot air passes up through the register 11, which is of the usual type of floor-registers commonly employed in the hot-air heating of houses. The hot air passes up into the hot-air chamber 4, down through the butterfly valve 12, into the outlet chamber 5, and out through the flue 13.

Cold air can be let into the fire chamber 3 through the ventilator 14, and the air from the fire chamber 3 can be let directly into the outlet chamber 5, through the sliding door 15.

The gas is controlled by valve 16, the register 11 is controlled by the rod 17, the butterfly valve 12 is controlled by handle 18, and the sliding door 15 is controlled by the rod 19. By means of these, and the ventilator 14, the degree of heat in the hot air chamber 4, can be regulated to a nicety. As the mold chamber 6 is open at the bottom to the hot-air chamber 4, it enjoys the same temperature.

The entire mold chamber 6 is easily removable, at the joints 20, and is made with different sizes of mold 21, to permit repairing different sizes of tire.

Patching or retreading of a shoe is accomplished as follows. The shoe 23, with patch applied, is inserted in the mold 21. A bag 24, containing hot sand, is inserted in the cavity of the shoe. On top of this bag is placed a curved piece of spring steel 25.

Outer bead-plates 26 and inner bead-plates 27 are placed along the bead of the shoe. There are four clamp-bolts 28, integral with the walls of the mold chamber 6. Over each pair of these is placed a clamp-arm 29, held down by nuts 30. Through this clamp-arm is screwed large screw 31, bearing on block 32 against the spring 33; also two small screws 34, bearing against the outer bead-plates 26. The inner bead-plates 27 are held in place by ordinary carpenter's clamps 35.

Thus there is brought to bear upon the shoe a tenway pressure, consisting in two large screws 31, four small screws 34, and four carpenter's clamps 35. The required degree of pressure is thus easily attained.

The heat is then turned on, and the temperature regulated, as hereinbefore described, preferably at about 307 degrees, the temperature being indicated by the thermometer 36.

The combination of the heat and the pressure causes the rubber of the patch to flow into the rubber and fabric of the old shoe, so as to form one homogeneous mass.

When the vulcanizing is completed, the heat is turned off as aforementioned, and the shoe is chilled by running water through pipes 37 into the hollow 38 between the walls of the mold 39, and out through pipe 40.

In changing molds, pipe-joints 41 are disconnected and the mold easily lifted off the base, separating from it at 20.

Clamp plates 42 fit against the flat side of the mold chamber 6, there being no opening underneath. An inner tube 43, to be patched, is placed, patch in, under one of these plates. Pressure is applied by screws 44, and heat and cooling are applied as in the case of a shoe.

The air-valves 45 serve to release any undue air pressure within the machine.

When retreading, a tread-plate 46 is inserted between the shoe and the mold.

Various changes may be made in any of the several embodiments of the invention hereinbefore described, without in the least departing from or sacrificing any of the advantages of the invention as defined in the appended claims.

I claim:

1. In a vulcanizer, the combination of a mould, a hot-air chamber for heating the mould, and means for cooling the same, said last-named means comprising a fluid-circulating conduit interposed between the hot-air chamber and the mould.

2. In a vulcanizer, the combination of a mould, means for applying high pressures to the mould, a hot-air chamber for heating the mould, and means for cooling the same, said last-named means comprising a fluid-circulating conduit interposed between the hot-air chamber and the mould.

3. In a vulcanizer of automobile tire shoes, the combination of an annular section of trough-shaped mould, having a channel for fluid in the bottom wall of the trough, means for bringing pressure to bear upon tire shoes placed within the trough, means for heating the outside of the trough, and means for running a cooling fluid through the channel.

4. In a vulcanizer of automobile tire shoes, the combination of an annular section of trough-shaped mould, having a channel for fluid in the wall of the trough, means for bringing pressure to bear upon tire shoes placed within the trough, means for heating the outside of the trough, and means for running a cooling fluid through the channel.

5. In a vulcanizer for automobile tire shoes, the combination of an annular section of trough-shaped mould, an annular section of trough-shaped tread-plate fitting within the bottom of said mould, two annular sections of outer bead-plate abutting against the edges of said tread plate, means to force said outer bead-plates against said tread-plate and thereby said tread-plate against said mould, two annular sections of inner bead-plate, means to clamp the bead of the tire between the outer and inner bead-plates, an element of yieldable material disposed within the shoe to be vulcanized, means for exerting pressure on this element, and means for heating the mould.

6. A vulcanizer according to claim 5, characterized by the fact each inner bead-plate has a beveled face bearing against a beveled face of the corresponding outer bead-plate, so that the clamping action between the bead-plates causes the inner bead-plate to bear down on the edge of the bead, as well as to clamp the bead outwardly against the outer bead-plate.

7. In a vulcanizer for automobile tire shoes, the combination of an annular section of trough-shaped mould, an annular section of trough-shaped tread-plate fitting within the bottom of said mould, two annular sections of outer bead-plate abutting against the edges of said tread-plate, means to force said outer bead-plates against said tread-plate and thereby said tread-plate against said mould, two annular sections of inner bead-plate, means to clamp the bead of the tire between the outer and inner bead-plates, a sand bag disposed within the shoe to be vulcanized, means for exerting pressure on this bag, and means for heating the mould.

8. A vulcanizer according to claim 7, characterized by the fact that the means for exerting pressure on the bag consist of a curved plate and means bearing thereon, and by the further fact that these means, and those for forcing the bead-plates against the tread plates, bear against elements extending across the top of the mould and secured thereto.

9. In a vulcanizer for automobile tire shoes, the combination of a mould, means for heating the same, and means for applying high pressures to the shoe while in the mould, said last named means comprising an element of yieldable material within the shoe, plates bearing laterally against the bead of the shoe, a curved plate bearing downwardly against said element, and a plurality of clamps bearing against said plates.

10. In a vulcanizer, the combination of a flue, a fire-chamber, a fire, means for selectively admitting the fire to the fire-chamber or excluding it therefrom, a mould, a mould chamber in contact therewith, means for selectively admitting cool air to the fire-chamber or excluding it therefrom, means for selectively admitting the air (hot or cold) from the fire-chamber to the mould chamber or excluding it therefrom, means for selectively permitting or not permitting the air to pass out from the mould chamber to the flue, and means for selectively permitting or not permitting the air from the fire-chamber to pass out directly to the flue.

11. In a vulcanizer, the combination of two chambers, one directly above the other, a mould in contact with the upper chamber, a shutter between the chambers, a gas or other similar flame admissible to the lower chamber, a shutter to admit outside air to the lower chamber, a flue adjacent both chambers, and a shutter between each chamber and the flue.

12. A vulcanizer according to claim 11, characterized by the further fact that the mould has a fluid-circulating passage within its walls for chilling the mould, and a thermometer for registering the temperature of the mould.

13. In a vulcanizer for automobile tire shoes, the combination of an annular section of trough-shaped mould, two annular sections of outer bead-plate, two annular sections of inner bead-plate, means to force two of said bead-plates downwardly, an interrelation between inner and outer bead-plates whereby the downward pressure on one is transmitted to the other, means to force each inner bead-plate against the corresponding outer bead-plate and thereby clamp the bead of the tire between them, an element of yieldable material disposed within the tire to be vulcanized, means for exerting pressure on this element whereby the tire is clamped between it and the mould, and means for heating the mould to vulcanize the tire.

ACHILLE A. BAFFETTI.